United States Patent
Garg et al.

(10) Patent No.: US 9,178,898 B2
(45) Date of Patent: Nov. 3, 2015

(54) DISTRIBUTED STATEFUL INTRUSION DETECTION FOR VOICE OVER IP

(75) Inventors: Sachin Garg, Bangalore (IN); Navjot Singh, Denville, NJ (US); Akshay Adhikari, Santa Clara, CA (US); Yu-Sung Wu, West Lafayette, IN (US)

(73) Assignee: Avaya Inc., Basking Ridge, NJ (US)

( * ) Notice: Subject to any disclaimer, the term of this patent is extended or adjusted under 35 U.S.C. 154(b) by 797 days.

(21) Appl. No.: 11/854,439

(22) Filed: Sep. 12, 2007
(Under 37 CFR 1.47)

(65) Prior Publication Data

US 2009/0070875 A1   Mar. 12, 2009

(51) Int. Cl.
*G06F 21/00* (2013.01)
*H04L 29/06* (2006.01)

(52) U.S. Cl.
CPC ......... *H04L 63/1416* (2013.01); *H04L 65/1006* (2013.01)

(58) Field of Classification Search
USPC .......... 726/11, 13, 22, 23; 709/223, 224, 227, 709/228, 229
See application file for complete search history.

(56) References Cited

U.S. PATENT DOCUMENTS

| | | | |
|---|---|---|---|
| 5,557,742 A | 9/1996 | Smaha et al. | |
| 6,789,202 B1 | 9/2004 | Ko et al. | |
| 6,880,087 B1 | 4/2005 | Carter | |
| 7,262,697 B2 | 8/2007 | Meng et al. | |
| 7,370,357 B2 | 5/2008 | Sekar | |
| 7,441,429 B1 | 10/2008 | Nucci et al. | |
| 7,653,188 B2 | 1/2010 | Kloberdans et al. | |
| 8,640,238 B2* | 1/2014 | Brueckner et al. | 726/23 |
| 2001/0052014 A1* | 12/2001 | Sheymov et al. | 709/225 |
| 2003/0185370 A1 | 10/2003 | Rosera et al. | |
| 2005/0111460 A1 | 5/2005 | Sahita | |
| 2005/0201363 A1 | 9/2005 | Gilchrist et al. | |
| 2005/0229246 A1 | 10/2005 | Rajagopal et al. | |
| 2005/0234915 A1* | 10/2005 | Ricciulli | 707/10 |
| 2006/0075497 A1* | 4/2006 | Garg et al. | 726/23 |
| 2006/0075498 A1 | 4/2006 | Yeom | |
| 2006/0119486 A1 | 6/2006 | Kim et al. | |
| 2006/0137009 A1* | 6/2006 | Chesla | 726/22 |
| 2006/0190592 A1 | 8/2006 | Fujita et al. | |
| 2006/0195896 A1* | 8/2006 | Fulp et al. | 726/11 |
| 2006/0288413 A1 | 12/2006 | Kubota | |

(Continued)

OTHER PUBLICATIONS

SCIDIVE: A Stateful and Cross Protocol Intrusion De Architecture for Voice-over-IP Environments, Wu et al, IEEE 2004.*

(Continued)

*Primary Examiner* — Luu Pham
*Assistant Examiner* — Jahangir Kabir
(74) *Attorney, Agent, or Firm* — Maldjian Law Group LLC (57) ABSTRACT

An apparatus and method for detecting intrusions in Voice over Internet Protocol systems with distributed stateful intrusion detection. When a Session Initiation Protocol (SIP) signal is received as an application-layer protocol signal, the received application-layer protocol signal is distributed to a first finite-state machine and to a second finite-state machine. A data processing system detects that the application-layer protocol enters a first application-layer protocol state S1 at a first node at a first time, determines whether the application-layer protocol fails to enter a second application-layer protocol state S2 at a second node within δ seconds, a positive real number, and generates a signal that indicates a potential intrusion in response to the determination.

6 Claims, 12 Drawing Sheets

(56) References Cited

U.S. PATENT DOCUMENTS

| | | | |
|---|---|---|---|
| 2007/0036314 | A1 | 2/2007 | Kloberdans et al. |
| 2007/0121596 | A1 | 5/2007 | Kurapati et al. |
| 2007/0133757 | A1 | 6/2007 | Girouard et al. |
| 2007/0143846 | A1 | 6/2007 | Lu |
| 2007/0150276 | A1 | 6/2007 | Srivastava et al. |
| 2007/0150773 | A1 | 6/2007 | Srivastava et al. |
| 2007/0165811 | A1 | 7/2007 | Reumann et al. |
| 2007/0177615 | A1 | 8/2007 | Miliefsky |
| 2007/0180527 | A1* | 8/2007 | Yeom ............................... 726/23 |
| 2007/0201660 | A1 | 8/2007 | Lan et al. |
| 2008/0037440 | A1 | 2/2008 | Politowicz |
| 2008/0043980 | A1 | 2/2008 | Delmege et al. |
| 2008/0047012 | A1* | 2/2008 | Rubin et al. ..................... 726/23 |
| 2008/0084975 | A1 | 4/2008 | Schwartz |
| 2009/0106183 | A1 | 4/2009 | Estan et al. |
| 2010/0328074 | A1 | 12/2010 | Johnson et al. |
| 2011/0066849 | A1 | 3/2011 | Niccolini et al. |
| 2014/0310810 | A1* | 10/2014 | Brueckner et al. .............. 726/23 |

OTHER PUBLICATIONS

The design of a distributed network intrusion detection system IA-NIDS, Xue et al IEEE 2006.*

A Memory-Efficient Parallel String Matching Architecture for High-Speed Intrusion Detection, Zheng et al, IEEE 2006.*

Protocol decode based stateful firewall policy definition language, Parmer et al, IEEE 2004.*

Schossmaier, K., "EP Application No. 08014898.4-2413 Office Action Oct. 9, 2009", , Publisher: EPO, Published in: EP.

Jiang et al., "Temporal and Spatial Distributed Event Correlation for Network Security", Jun. 30, 2004, Publisher: American Control Conference 2004 Boston Massachusetts, Published in: US.

Khanna et al., "Self Checking Network Protocols: A Monitor Based Approach", Oct. 18, 2004, Publisher: Symposium on Reliable Distributed Systems 2004, Published in: US.

Schossmaier, Klaus, "EP Application No. 08014898.4 Search Report", Feb. 5, 2009, Publisher: EPO, Published in: EP.

Schossmaier, Klaus, "EP Application No. 08014898.4 Office Action Aug. 9, 2010", , Publisher: EPO, Published in: EP.

Chen, Eric Y., "Detecting DoS Attacks on SIP Systems", "1st IEEE Workshop on VoIP Management and Security XP-010919088", Apr. 3, 2006, pp. 51-56, Publisher: IEEE.

Ding et al., "Intrusion detection system for signal based SIP attacks through timed HCPN", "Second International Conference on Availability, Reliability and Security XP-031079585", Apr. 1, 2007, pp. 190-197, Publisher: IEEE Computer Society.

Barry et al., "Towards Intelligent Cross Protocol Intrusion Detection in the Next Generation Networks based on Protocol Anomaly Detecti", "9th International Conference on Advanced Communication Technology XP-031085043", Feb. 12-14, 2007, pp. 1505-1510.

Sengar et al., "VoIP Intrusion Detection Through Interacting Protocol State Machines", "Proceedings of the 2006 International Conference on Dependable Systems and Networks XP-010925326", Jun. 25, 2006, pp. 393-402, Publisher: IEEE Computer Society.

Lamelas Polo, Yvan, "EP Application No. 08163848.8 European Search Report Nov. 30, 2010", , Publisher: EPO, Published in: EP.

Khoshnoodi, Nadia, "U.S. Appl. No. 11/854,437 Office Action Sep. 15, 2010", , Publisher: USPTO, Published in: US.

Khoshnoodi, Nadia, "U.S. Appl. No. 11/854,437 Office Action Mar. 4, 2011", , Publisher: USPTO, Published in: US.

European Patent Application No. 08014898.4, Communication dated Aug. 4, 2011, Avaya, Inc. 4 pages.

Avaya Inc., Japanese Patent Application No. 2008-230505, Office Action dated Feb. 20, 2013, 3 pages.

Avaya Inc., Korean Patent Application No. 2008-0089765, Office Action dated Jan. 29, 2013, 2 pages.

Avaya Inc., Japanese Patent Application No. 2008-230503, Office Action dated Feb. 20, 2013, 4 pages.

Sekar, R. et al., "Specification-based Anomaly Detection: A New Approach for Detecting Network Instructions," 2002, 10 pages.

* cited by examiner

DISTRIBUTED STATEFUL INTRUSION DETECTION FOR VOICE OVER IP

FIELD OF THE INVENTION

The present invention relates to telecommunications in general, and, more particularly, to network security.

BACKGROUND OF THE INVENTION

An intrusion is when an unauthorized user (e.g., a "hacker," etc.) attempts to break into or misuse (e.g., steal confidential data, etc.) a computer system. An intrusion-detection system (IDS) monitors messages (e.g., packets, etc.) incoming to a computer system and outgoing from the computer system, and based on these messages tries to determine whether an intrusion is being attempted. An intrusion-detection system might conclude that an intrusion attempt is in progress when an atypical or suspicious sequence of messages occurs, or when a sequence of messages matches a known attack signature.

Figure 1:
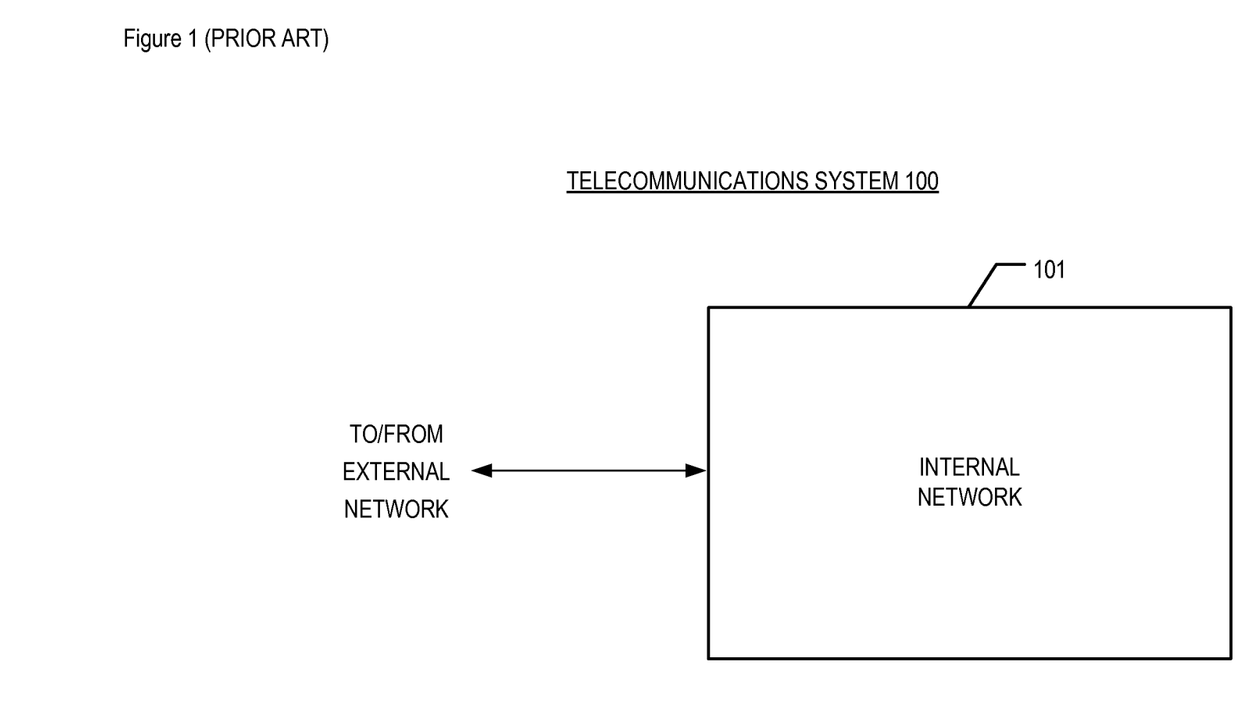
FIG. 1 depicts a schematic diagram of a telecommunications system in accordance with the prior art.

FIG. 1 depicts a schematic diagram of telecommunications system 100 in accordance with the prior art. As shown in FIG. 1, telecommunications system 100 comprises internal network 101 (e.g., a corporate metropolitan-area network, a residential local-area network, etc.), which receives messages via an external network (e.g., the Internet, etc.) and sends messages via the external network to external data-processing systems.

Figure 2:
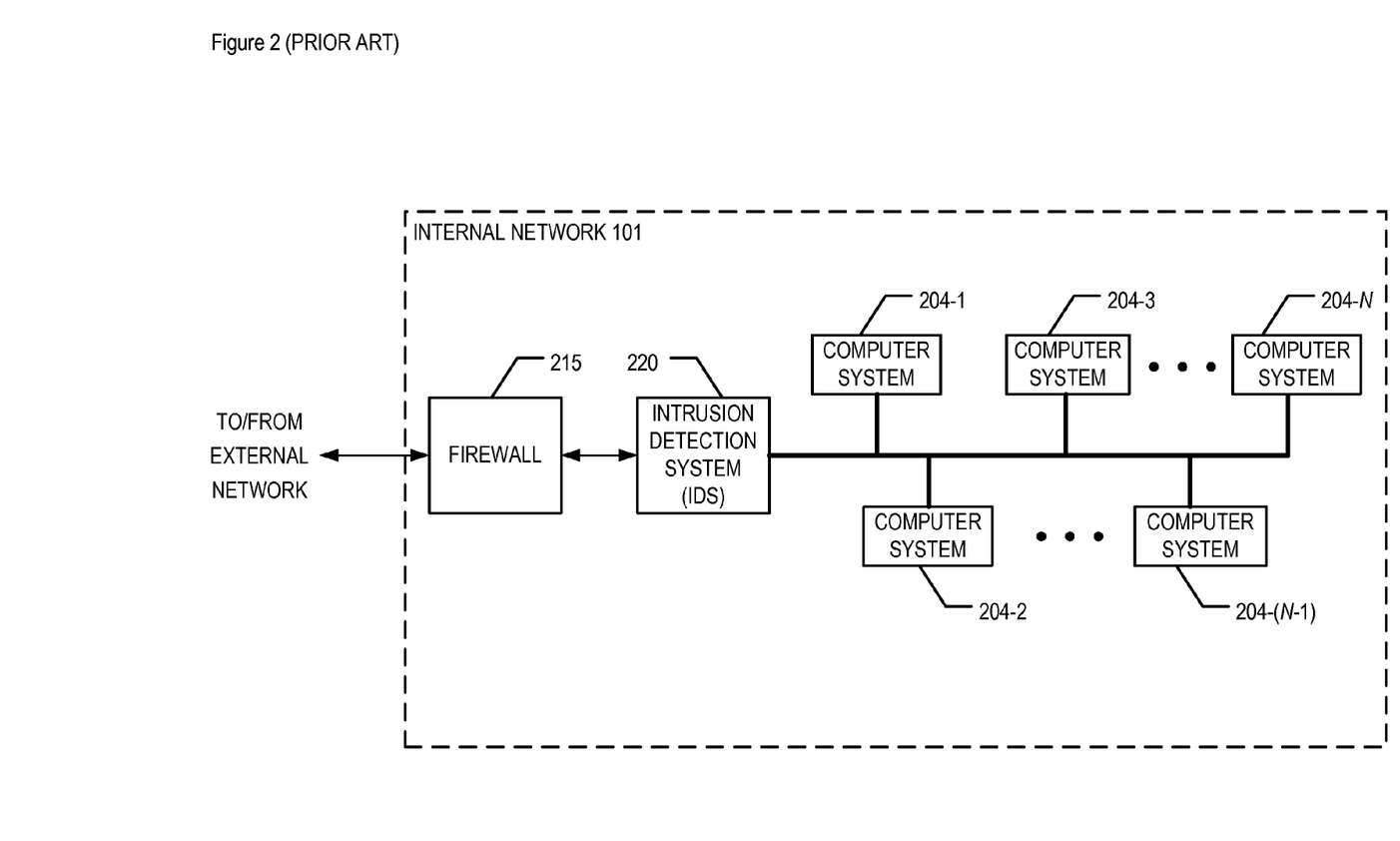
FIG. 2 depicts a schematic diagram of the salient elements of internal network 101, as shown in FIG. 1, in accordance with the prior art.

FIG. 2 depicts a schematic diagram of the elements of internal network 101, in accordance with the prior art. As shown in FIG. 2, internal network 101 comprises: intrusion-detection system (IDS) 220, firewall 215, and computer systems 204-1 through 204-N, where N is a positive integer, interconnected as shown.

Each computer system 204-$n$, where $n \in 1, 2, \ldots, N$, might be a personal computer, a server, a laptop computer, a personal digital assistant (PDA) with wireless local-area network communication capability, etc.

An incoming message that is directed to computer system 204-$n$, where $n \in 1, 2, \ldots, N$, first passes through firewall 215, which inspects the message and decides whether to block the message from reaching its destination or to let the message through based on rules in a rule set. Examples of rules include: block all messages from domain badguys.com; block all messages except those of a certain protocol type; etc.

If firewall 215 lets the incoming message through, then intrusion-detection system (IDS) 220 subsequently receives the message and inspects it. Intrusion-detection system (IDS) 220 provides an additional layer of security by detecting intrusion attempts that comprise one or more messages that are allowed through firewall 215. For example, firewall 215 might restrict external access to a web server in internal network 101 to port 80, but without an intrusion-detection system, it might be possible to attack the web server itself via legitimate traffic through port 80 due to bugs in the web server software (e.g., ColdFusion, Apache, etc.). As an analogy, firewall 215 acts as a "fence" around internal network 101. A fence provides security but does not have the ability to detect when someone is trying to break in (e.g., by digging an underground tunnel, etc.). Intrusion-detection system (IDS) 220 typically can recognize some break-in attempts that firewall 215 cannot detect, and therefore it is advantageous to deploy intrusion-detection system (IDS) 220 in addition to firewall 215 for added security.

When intrusion-detection system (IDS) 220 relies on an attack signature database, it is essential to keep the database up-to-date. In particular, over time malicious users often discover new techniques to exploit vulnerabilities and attack systems, and in response security experts formulate new attack signatures to guard against these techniques. As in the case of antivirus software, the owner of intrusion-detection system (IDS) 220 typically has two options to ensure that the attack signature database is regularly updated with new attack signatures: either subscribe to an automated update service provided by the vendor of intrusion-detection system (IDS) 220, or manually check for new attack signatures and retrieve and install them. In either case, the efficacy of intrusion-detection system (IDS) 220 depends on the owner's diligence—in the former option, the owner must periodically pay subscription fees in a timely fashion, and in the latter option, the owner must check for new updates with great frequency—as well as some combination of time, effort, and money.

Voice over Internet Protocol (VoIP) systems transmit voice traffic over packet-switched Internet Protocol (IP) data networks in lieu of circuit-switched telephony networks (e.g., the Public Switched Telephone Network, etc.). Typically, Voice over Internet Protocol systems are based one of two main protocols: H323 and Session Initiation Protocol (SIP). In both types of systems, VoIP user agents at the calling and called telecommunications terminals (e.g., hardphones, softphones, etc.) send and receive packets that contain encoded voice signals in accordance with the Real-time Transport Protocol (RTP). In addition, a VoIP gateway might employ a media management protocol such as the Media Gateway Control Protocol (MGCP) or MEGACO/H.248 in order to translate traffic transparently between an IP-based network and a non-IP-based network (e.g., between a PSTN phone and an IP phone, etc.).

A key benefit of VoIP is that it enables the convergence of voice and data networks. By migrating voice traffic to data networks, however, the voice network becomes vulnerable to intrusions and other attacks (e.g., denial-of-service attacks, authentication attacks, etc.) that compromise privacy, quality of service, and accurate billing. Moreover, due to characteristics of Voice over Internet Protocol systems, some intrusion-detection systems of the prior art provide inadequate security against intrusions that employ VoIP packets (i.e., VoIP-based intrusions).

SUMMARY OF THE INVENTION

The present invention enables the detection of intrusions in Voice over Internet Protocol (VoIP) systems, without the use of an attack signature database. In particular, the illustrative embodiment is based on two observations. The first observation is that various VoIP-related protocols (e.g., the Session Initiation Protocol [SIP], etc.) are simple enough to be represented by a finite-state machine (FSM) of compact size, thereby avoiding the disadvantages inherent in signature-based intrusion-detection systems. The second observation is that there exist intrusions that might not be detectable locally by the individual finite-state machines (FSMs), but that can be detected with a global (or distributed) view of all the finite-state machines (FSMs) involved in a particular session.

The illustrative embodiment maintains a finite-state machine (FSM) for each session/node/protocol combination representing the allowed (or "legal") states and state transitions for the protocol at that node in that session, as well as a "global" finite-state machine (FSM) for the entire session that enforces constraints on the individual finite-state machines (FSMs) and is capable of detecting intrusions even when each of the individual session/node/protocol finite-state machine (FSMs) are in legal states.

The illustrative embodiment comprises: generating a signal that indicates a potential intrusion when a protocol fails to enter a first state at a first node within δ seconds of said protocol entering a second state at a second node, wherein δ is a positive real number.

DETAILED DESCRIPTION

For the purposes of this specification, the following terms and their inflected forms are defined as follows:

The term "node" is defined as an endpoint in a network (e.g., a telecommunications terminal, a gateway, a router, a server, a firewall, an intrusion-detection system, etc.).

The term "VoIP node" is defined as a node that is capable of receiving, transmitting, and/or processing Voice-over-Internet Protocol (VoIP) messages.

Figure 3:
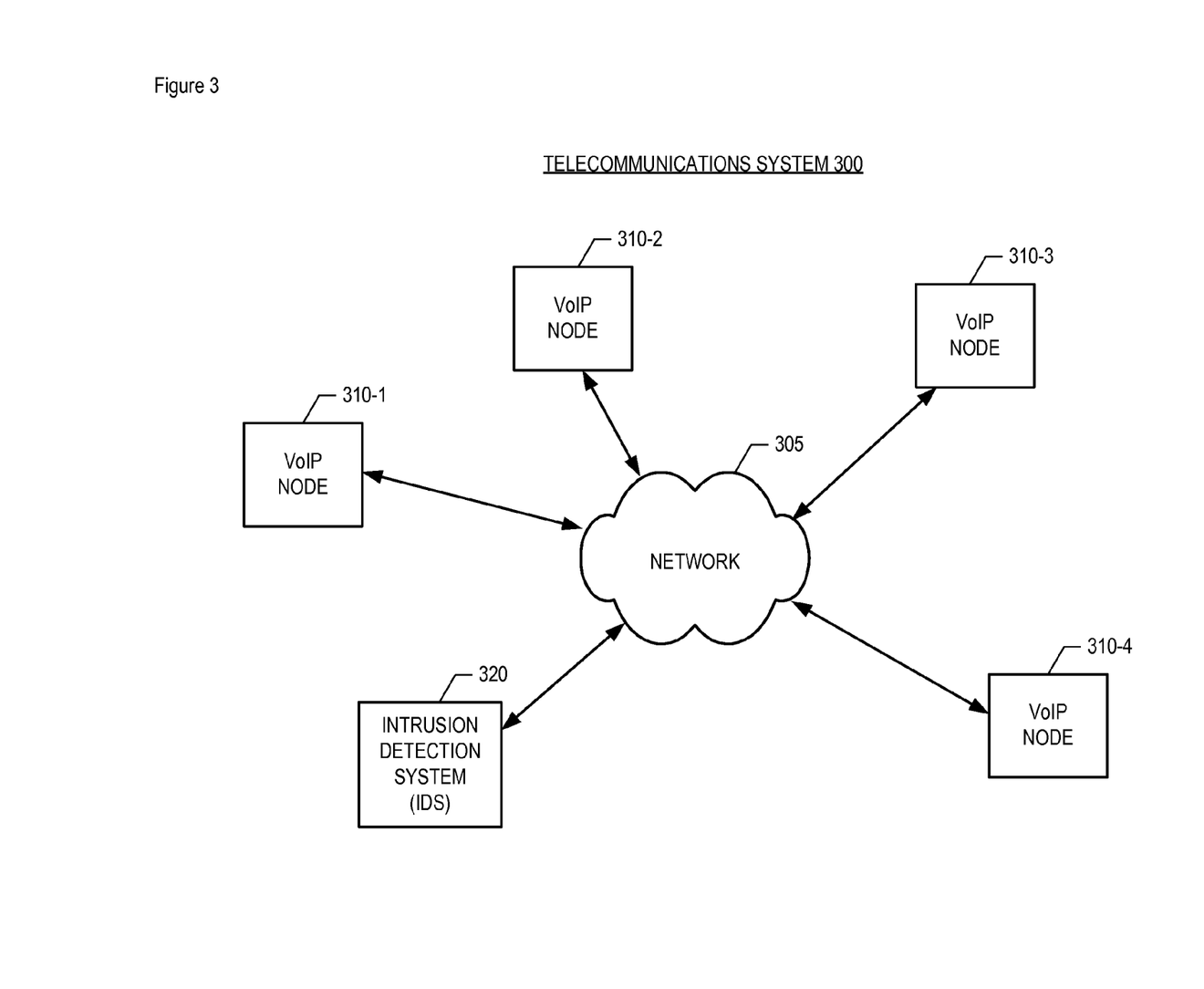
FIG. 3 depicts a telecommunications system in accordance with the illustrative embodiment of the present invention.

FIG. 3 depicts telecommunications system 300 in accordance with the illustrative embodiment of the present invention. As shown in FIG. 3, telecommunications system 300 comprises network 305, four Voice-over-IP (VoIP) nodes 310-1 through 310-4, and intrusion-detection system (IDS) 320, interconnected as shown.

Network 305 is capable of transporting messages between a source (e.g., one of VoIP nodes 310-1 through 310-4, from IDS 320, etc.) and destination (e.g., one of VoIP nodes 310-1 through 310-4, from IDS 320, etc.) in well-known fashion. As will be appreciated by those skilled in the art, network 305 is depicted in FIG. 3 in a conceptual and abstract manner: in some embodiments network 305 might be a wireless network, while in some other embodiments network 305 might be a wired network, while in yet some other embodiments network 305 might comprise both wired and wireless technologies, or might in fact comprise a plurality of constituent networks (for example, a combination of the Public Switched Telephone Network [PSTN], the Internet, and a wireless local-area network). As will be further appreciated by those skilled in the art, the fact that telecommunications system 300 comprises four VoIP nodes is merely illustrative, and in some other embodiments there might be a fewer number or greater number of VoIP nodes 310.

Each VoIP node 310-i, where i is an integer between 1 and 4 inclusive, is one of a VoIP-capable terminal, server, gateway, etc. that is capable of transmitting and receiving messages in accordance with one or more Voice-over-IP protocols (e.g., Session Initiation Protocol [SIP], Real-time Transport Protocol [RTP], etc.), in well-known fashion. In accordance with the illustrative embodiment, each VoIP node 310-i is programmed to notify intrusion-detection system (IDS) 320 of any protocol state transitions at VoIP node 310-i. For example, when there is a change in the state of the Session Initiation Protocol (SIP) at VoIP node 310-i, VoIP node 310-i might transmit a SIP message that is ignored by other VoIP nodes but that indicates to IDS 320 of the protocol state change.

It will be clear to those skilled in the art, after reading this disclosure, how to make and use VoIP nodes 310 in accordance with the illustrative embodiment. As will be appreciated by those skilled in the art, there are a variety of alternative techniques that might be employed for notifying IDS 320 of protocol state transitions at VoIP nodes 310, and it will be clear to those skilled in the art, after reading this disclosure, how to make and use VoIP nodes 310 that employ such techniques.

Intrusion-detection system (IDS) 320 is capable of: monitoring messages transported over network 305 (i.e., "packet sniffing") in well-known fashion; of being programmed to block messages in accordance with one or more specified policies, after an intrusion has been detected; and of executing the tasks described below and with respect to FIGS. 10 through 12. A schematic diagram of the salient elements of intrusion-detection system (IDS) 320 is described below and with respect to FIG. 4, and a pictorial representation of the salient data stored at intrusion-detection system (IDS) 320 is described below and with respect to FIGS. 5 through 9.

As will be appreciated by those skilled in the art, although the illustrative embodiment employs a single centralized intrusion-detection system (IDS) 320, some other embodiments of the present invention might employ a plurality of intrusion-detection systems in a distributed manner (for example, an IDS embedded at every VoIP node), and it will be clear to those skilled in the art, after reading this disclosure, how to make and use such embodiments.

Figure 4:
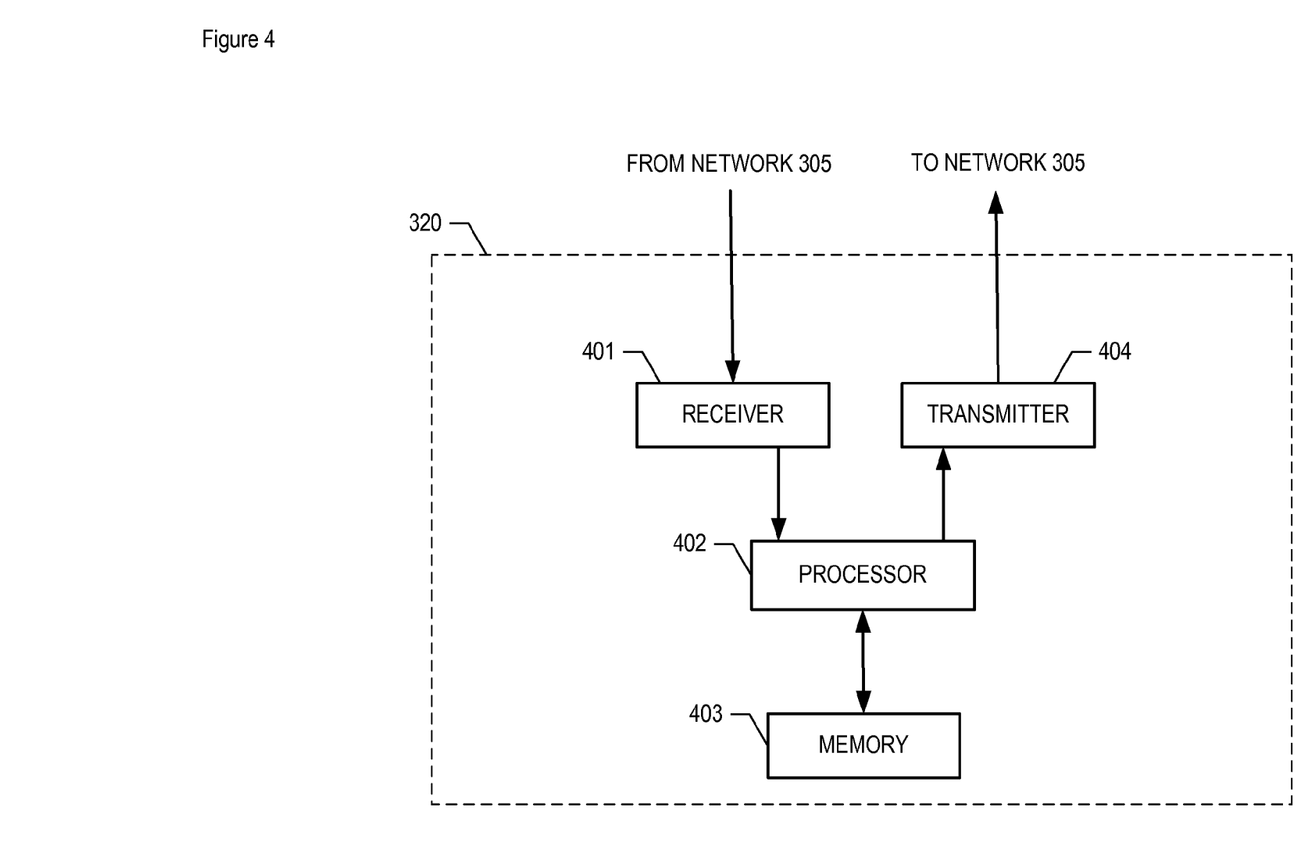
FIG. 4 depicts a schematic diagram of the salient elements of intrusion-detection system (IDS) 320, as shown in FIG. 3, in accordance with the illustrative embodiment of the present invention.

FIG. 4 depicts a schematic diagram of the salient elements of intrusion-detection system (IDS) 320 in accordance with the illustrative embodiment of the present invention. As shown in FIG. 4, intrusion-detection system (IDS) 320 comprises receiver 401, processor 402, memory 403, and transmitter 404, interconnected as shown.

Receiver 401 receives signals from network 305 and forwards the information encoded in the signals to processor 402, in well-known fashion. It will be clear to those skilled in the art, after reading this disclosure, how to make and use receiver 401.

Processor 402 is a general-purpose processor that is capable of receiving information from receiver 401, of executing instructions stored in memory 403 (including, in particular, instructions corresponding to the tasks of FIG. 7), of reading data from and writing data into memory 403, and of transmitting information to transmitter 404. In some alternative embodiments of the present invention, processor 402 might be a special-purpose processor. In either case, it will be clear to those skilled in the art, after reading this disclosure, how to make and use processor 402.

Memory 403 stores data and executable instructions, as is well-known in the art, and might be any combination of random-access memory (RAM), flash memory, disk drive memory, etc. It will be clear to those skilled in the art, after reading this disclosure, how to make and use memory 403.

Transmitter 404 receives information from processor 402 and transmits signals that encode this information to network 305, in well-known fashion. It will be clear to those skilled in the art, after reading this disclosure, how to make and use transmitter 404.

Figure 5:
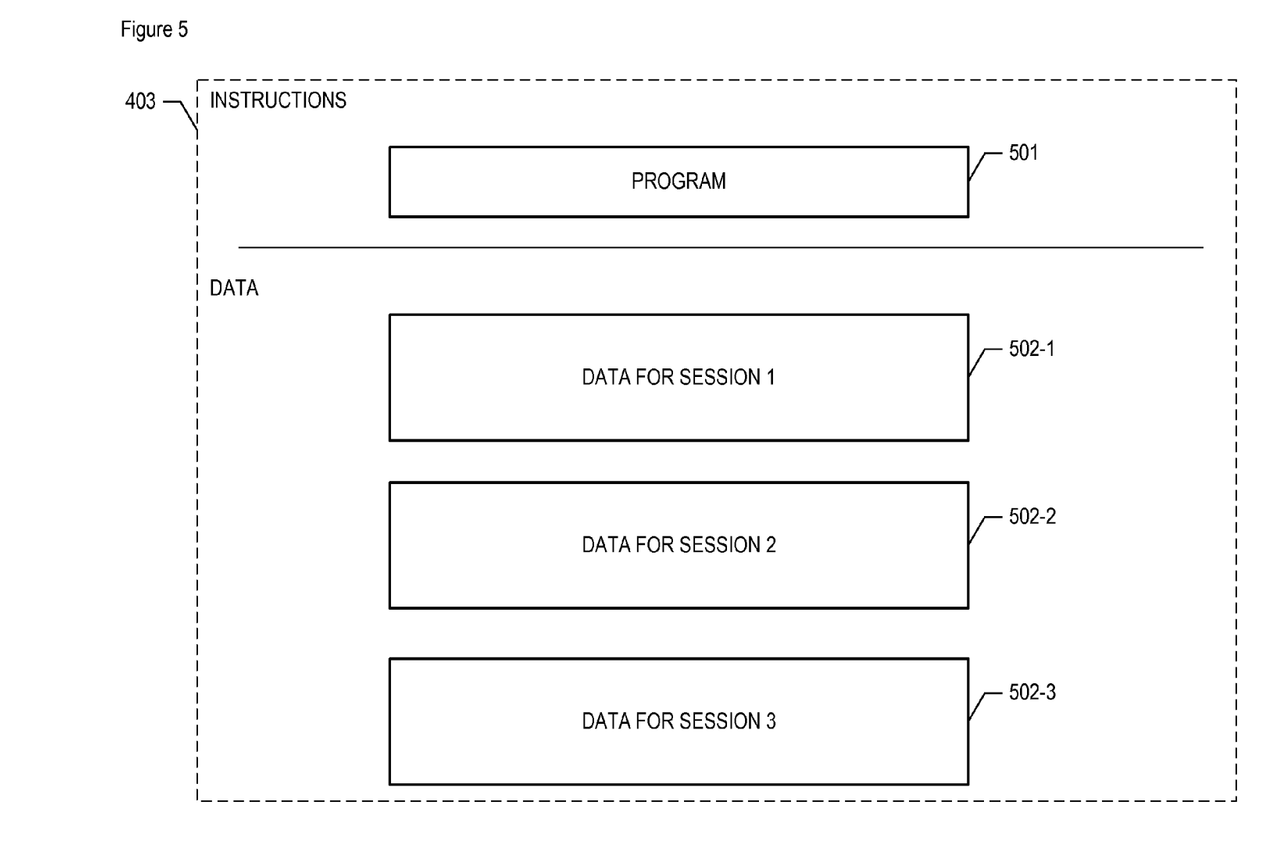
FIG. 5 depicts a schematic diagram of the salient contents of memory 403, as shown in FIG. 4, in accordance with the illustrative embodiment of the present invention.

FIG. 5 depicts a schematic diagram of the salient contents of memory 403 in accordance with the illustrative embodiment of the present invention. As shown in FIG. 5, memory 403 comprises a first portion with instructions to be executed by processor 402, and a second data portion. The first portion comprises program 501, which executes the tasks described below and with respect to FIGS. 10 through 12. The second portion comprises three data blocks 502-1 through 502-3 corresponding to three corresponding sessions; the contents of these data blocks is described below and with respect to FIGS. 6 through 9. As will be appreciated by those skilled in the art, the fact that three data blocks 502 are depicted in FIG. 5 is merely illustrative, and there might be a fewer number or greater number of data blocks 502 corresponding to respective sessions.

Figure 6:
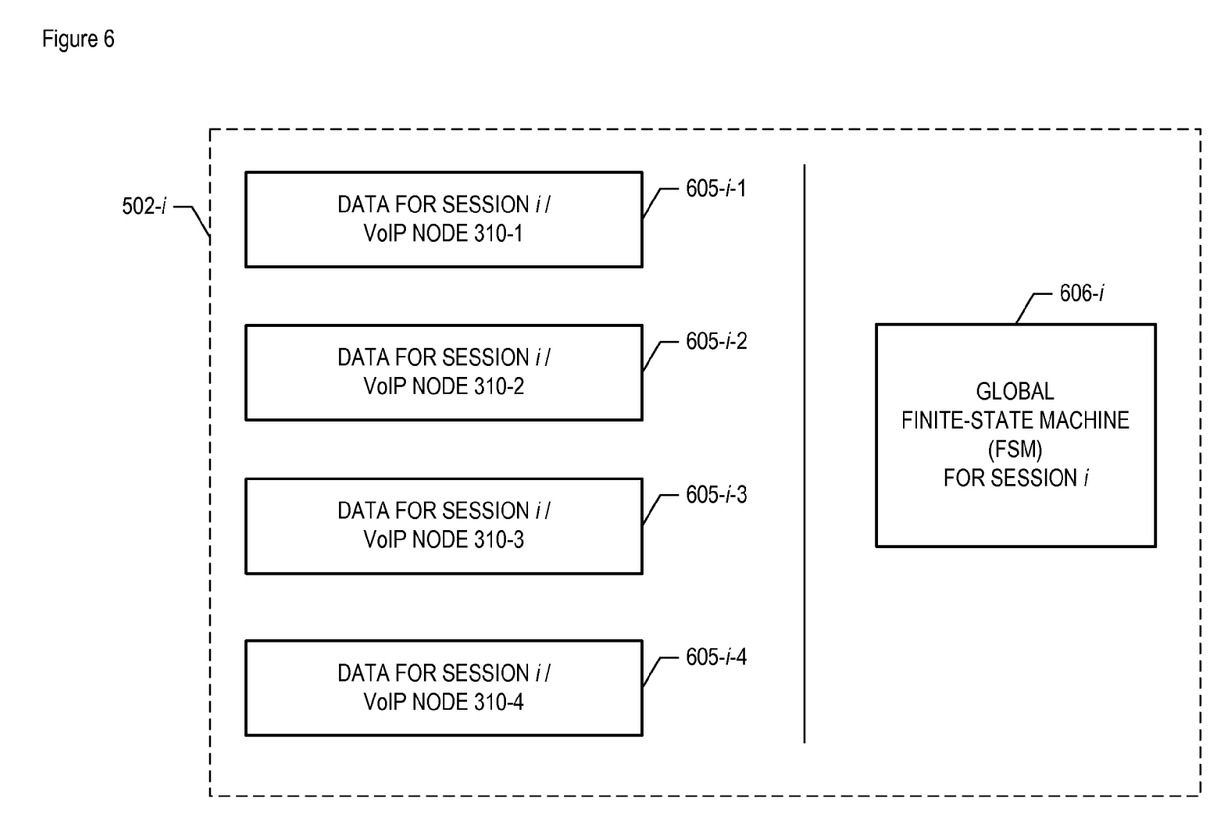
FIG. 6 depicts a schematic diagram of the salient contents of data block 502-i, as shown in FIG. 5, in accordance with the illustrative embodiment of the present invention.

FIG. 6 depicts a schematic diagram of the salient contents of data block 502-$i$ in accordance with the illustrative embodiment of the present invention. As shown in FIG. 6, data block 502-$i$ comprises data sub-blocks 605-$i$-1 through 602-$i$-4, each of which is associated with a respective node 310-$i$ that participates in session i, and global finite-state machine (FSM) 606-$i$ for session i, which is described in detail below and with respect to FIG. 9. As in the case of data blocks 502, it will be appreciated by those skilled in the art that the depiction of four data sub-blocks 605 is merely illustrative, and there might be a fewer number or greater number of data sub-blocks 605 corresponding to respective nodes in session i.

Figure 7:
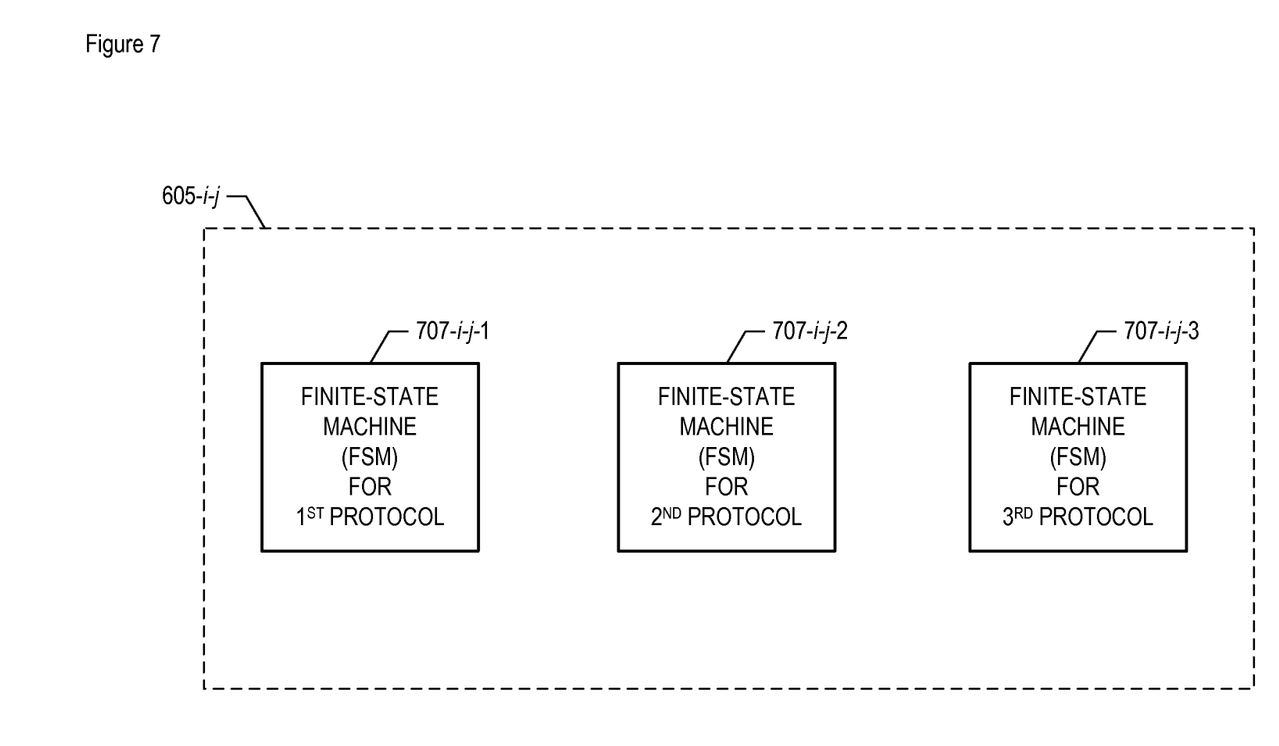
FIG. 7 depicts a schematic diagram of the salient contents of data sub-block 605-i-j, as shown in FIG. 6, in accordance with the illustrative embodiment of the present invention.

FIG. 7 depicts a schematic diagram of the salient contents of data sub-block 605-$i$-$j$ in accordance with the illustrative embodiment of the present invention. As shown in FIG. 6, data sub-block 605-$i$-$j$ comprises finite-state machines (FSMs) 770-$i$-$j$-1 through 770-$i$-$j$-3, each of which is associated with the state of a respective protocol (e.g., Session Initiation Protocol [SIP], Real-time Transport Protocol [RTP], etc.) at VoIP node 310-$j$ during session i. Each finite-state machine 770-$i$-$j$-$k$ represents the possible (or "legal") states and state transitions for its corresponding protocol, and keeps tracks of the current state of that protocol at VoIP node 310-$j$ during session i. Finite-state machine 770-$i$-$j$-$k$ is described in detail below and with respect to FIG. 8.

As will be appreciated by those skilled in the art, the fact that data sub-block 605-$i$-$j$ comprises three finite-state machines 770 is merely illustrative, and there might be a fewer number or greater number of finite-state machines 770 corresponding to respective protocols at VoIP node 310-$j$ in session i.

Figure 8:
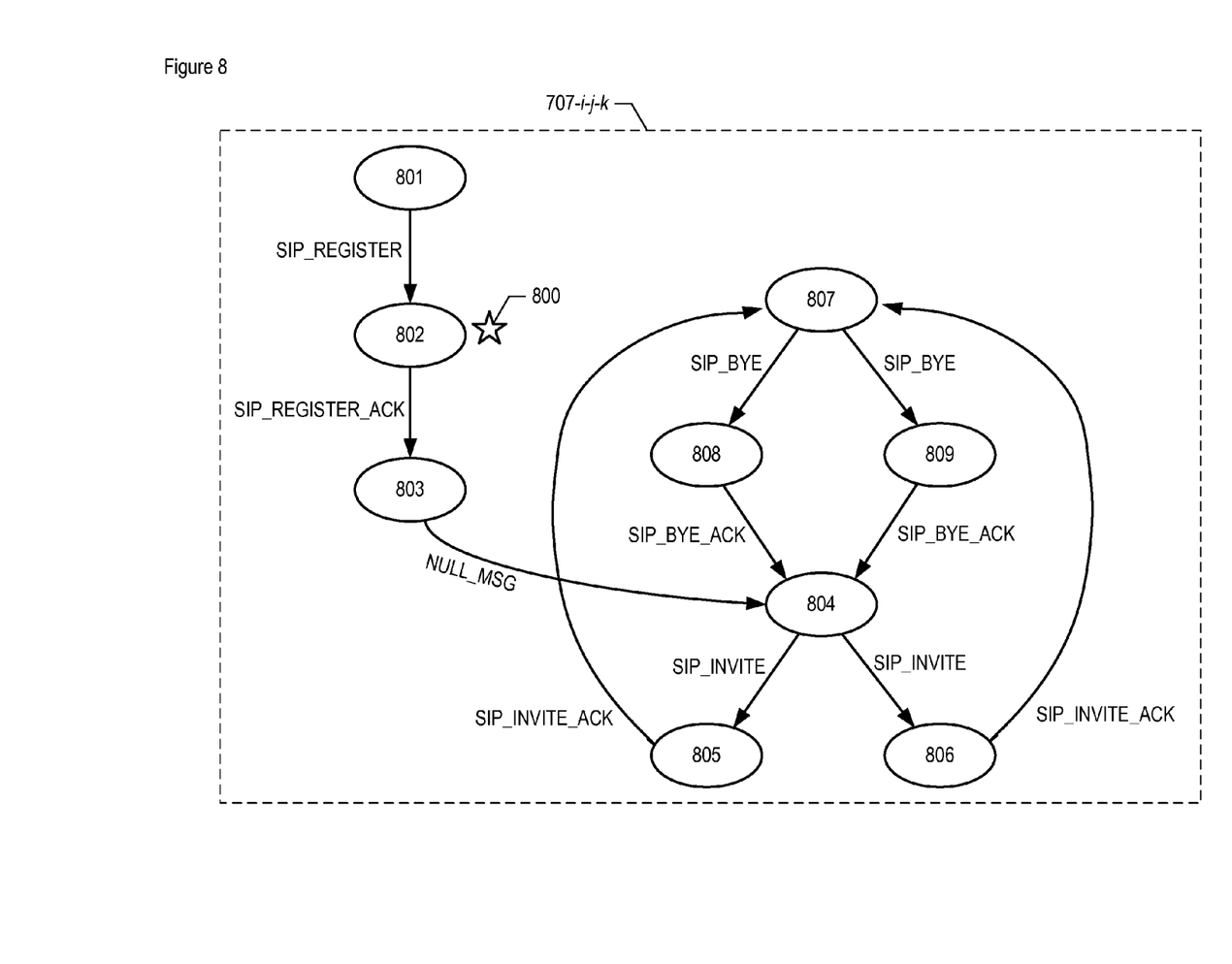
FIG. 8 depicts illustrative finite-state machine 707-i-j-k, as shown in FIG. 7, in accordance with the illustrative embodiment of the present invention.

FIG. 8 depicts an illustrative finite-state machine (FSM) 707-$i$-$j$-$k$ in accordance with the illustrative embodiment of the present invention. In particular, finite-state machine 707-$i$-$j$-$k$ corresponds to the legal states and state transitions of the Session Initiation Protocol (SIP) at a calling VoIP-capable terminal 310-$j$ during a session i.

As shown in FIG. 8, finite-state machine (FSM) 707-$i$-$j$-$k$ comprises nine states 801 through 809, where 801 is the starting state for a SIP session at VoIP-capable terminal 310-$i$, and token 800, which keeps track of the current state of FSM 707-$i$-$j$-$k$ (state 802 in FIG. 8). Each arc (or directed edge) in finite-state machine (FSM) 707-$i$-$j$-$k$ indicates a legal transition from a first state to a second state, where the label on the arc indicates a type of message (e.g., SIP_INVITE, SIP_INVITE_ACK, etc.) received or transmitted by node 310-$i$ that engenders the state change.

As will be appreciated by those skilled in the art, although in the illustrative finite-state machine (FSM) 707-$i$-$j$-$k$ of FIG. 8 every arc label corresponds to a message received or transmitted by VoIP node 310-$j$, in some other embodiments of the present invention finite-state machine (FSM) 707-$i$-$j$-$k$ might have one or more arc labels that correspond to a message that does not involve VoIP node 310-$j$ at all. Moreover, in some other embodiments of the present invention, finite-state machine (FSM) 707-$i$-$j$-$k$ might have one or more arc labels that correspond to a signal other than a protocol-related message (e.g., a remote procedure call, some other kind of message, etc.). In any case, it will be clear to those skilled in the art, after reading this disclosure, how to formulate and use finite-state machines with these various kinds of arc labels.

Figure 9:
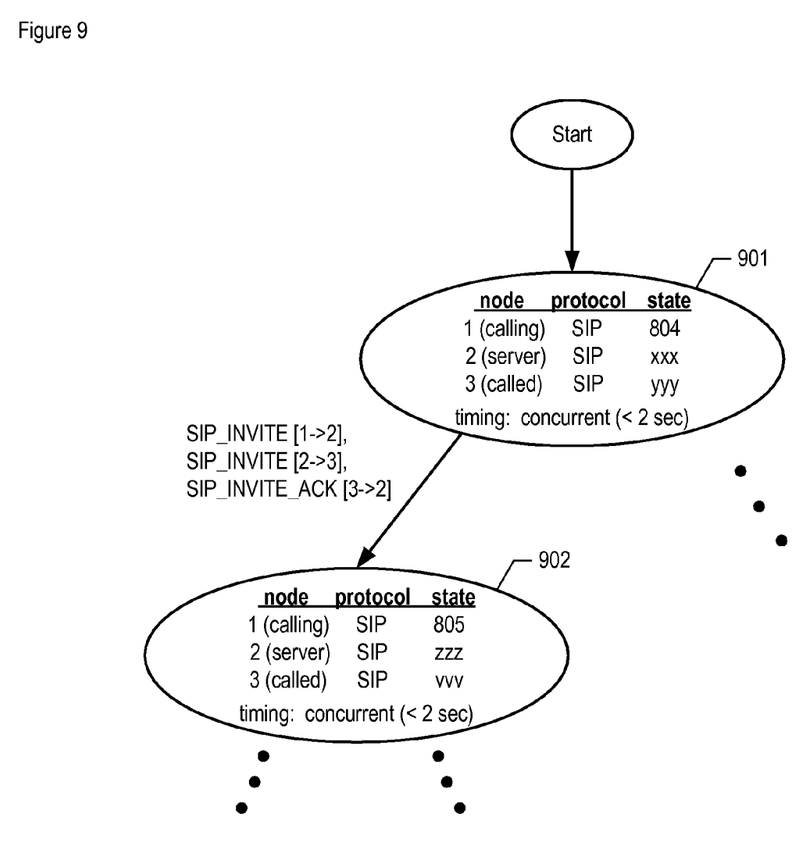
FIG. 9 depicts a portion of illustrative global finite-state machine 606-i, as shown in FIG. 6, in accordance with the illustrative embodiment of the present invention.

FIG. 9 depicts a portion of illustrative global finite-state machine (FSM) 606-$i$ in accordance with the illustrative embodiment of the present invention. The portion of global finite-state machine (FSM) 606-$i$ depicted in FIG. 9 comprises a start state, state 901, state 902, an arc from the start state to state 901, and an arc from state 901 to state 902.

State 901 represents a composite of the states of: a calling node's FSM 707 (state 804), a server's FSM 707 (state xxx), and a called node's FSM 707 (yyy). In accordance with the illustrative embodiment, state 901 enforces a constraint on these three nodes' FSMs that these FSMs must concurrently be in the indicated respected states, within a specified concurrency time limit (two seconds in this case). In other words, once one of these nodes' FSM 707 reaches its indicated state, then the other two nodes' respective FSMs 707 must also reach their indicated states within two seconds. If this currency constraint is not satisfied, then an alert indicating a potential intrusion is generated, as described in detail below and with respect to FIG. 12.

Similarly, state 902 represents a composite of the states of the calling node's FSM (state 805), the server's FSM (state zzz), and the called node's FSM (state www), and indicates a concurrency constraint of three seconds on these states.

The arc from the start state to state 901 represents a state transition that occurs automatically upon initial execution of global finite-state machine (FSM) 606-$i$, as is typical in the art.

The arc from state 901 to state 902 represents a state transition that occurs when a first SIP_INVITE message is sent from the calling node to the server, a second SIP_INVITE message is sent from the server to the called node, and a SIP_INVITE_ACK message is sent back from the called node to the server.

As will be appreciated by those skilled in the art, the particular composite states, state transitions, and concurrency constraints of FIG. 9 are merely illustrative in nature. As will further be appreciated by those skilled in the art, in some other embodiments of the present invention, global finite-state machine (FSM) 606-*i* might employ other kinds of constraints in addition to, or in lieu of, the concurrency constraints of the finite-state machine depicted in FIG. 9. For example, a "non-concurrency" constraint might cause an alert to be generated if the specified states of FSMs 707 are in fact reached concurrently (plus or minus the specified time limit). As another example, a constraint might require that at least two of the three specified FSM 707 states be reached concurrently, or might be unrelated to the timing of the FSM 707 states (e.g., enforcing a condition on the number of times that a FSM 707 state is visited, etc.). It will be clear to those skilled in the art, after reading this disclosure, how to make and use embodiments of the present invention that employ such alternative constraints in global finite-state machine (FSM) 606-*i*.

Figure 10:
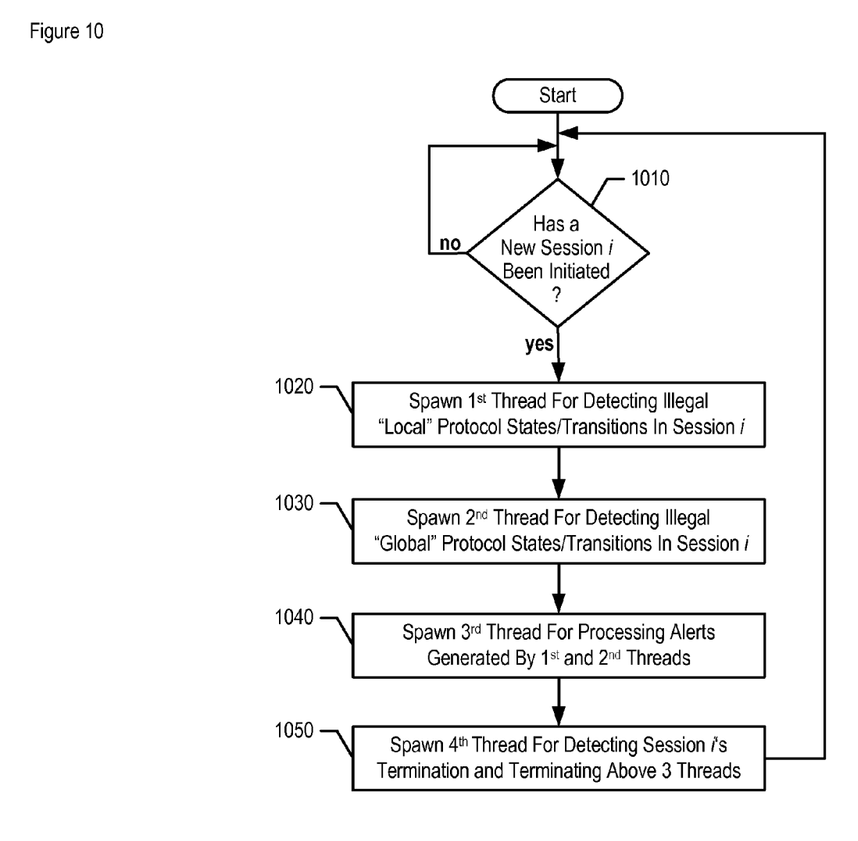
FIG. 10 depicts a flowchart of the salient tasks of intrusion-detection system (IDS) 320 in accordance with the illustrative embodiment of the present invention.

FIG. 10 depicts a flowchart of the salient tasks of intrusion-detection system (IDS) 320 in accordance with the illustrative embodiment of the present invention. It will be clear to those skilled in the art, after reading this disclosure, which tasks depicted in FIG. 8 can be performed simultaneously or in a different order than that depicted.

At task 1010, intrusion-detection system (IDS) 320 checks whether a new session i has been initiated. If so, execution proceeds to task 1020, otherwise execution continues back at task 1010 again.

At task 1020, intrusion-detection system (IDS) 320 spawns a first thread for detecting illegal "local" protocol states or transitions in session i, as described in detail below and with respect to FIG. 11.

At task 1030, intrusion-detection system (IDS) 320 spawns a second thread for detecting illegal "global" protocol states or transitions in session i, as described in detail below and with respect to FIG. 12.

At task 1040, intrusion-detection system (IDS) 320 spawns a third thread for processing alerts that are generated by the first and second threads. As will be appreciated by those skilled in the art, the particular measures taken at task 1040 will depend on the programmed policies of the particular implementation, and might include simple logging of the alert, blocking subsequent messages accordingly from reaching their destinations, "locking down" one or more nodes participating in session i, etc. As will be appreciated by those skilled in the art, in the case of blocking subsequent messages, in some embodiments of the present invention intrusion-detection system (IDS) 320 might actively participate in the blocking of messages, while in some other embodiments intrusion-detection system (IDS) 320 might instruct some other entity (e.g., a firewall, a security appliance, etc.) to block messages. In any case, it will be clear to those skilled in the art, after reading this disclosure, how to program intrusion-detection system (IDS) 320 to carry out such blocking, and/or any other measures, at task 1040.

At task 1050, intrusion-detection system (IDS) 320 spawns a fourth thread for detecting when session i has terminated, and in response, terminating the first three threads, and finally itself. It will be clear to those skilled in the art, after reading this disclosure, how to program intrusion-detection system (IDS) 320 to perform task 1050.

After task 1050 is completed, execution of the method of FIG. 10 continues back at task 1010 for subsequent iterations.

Figure 11:
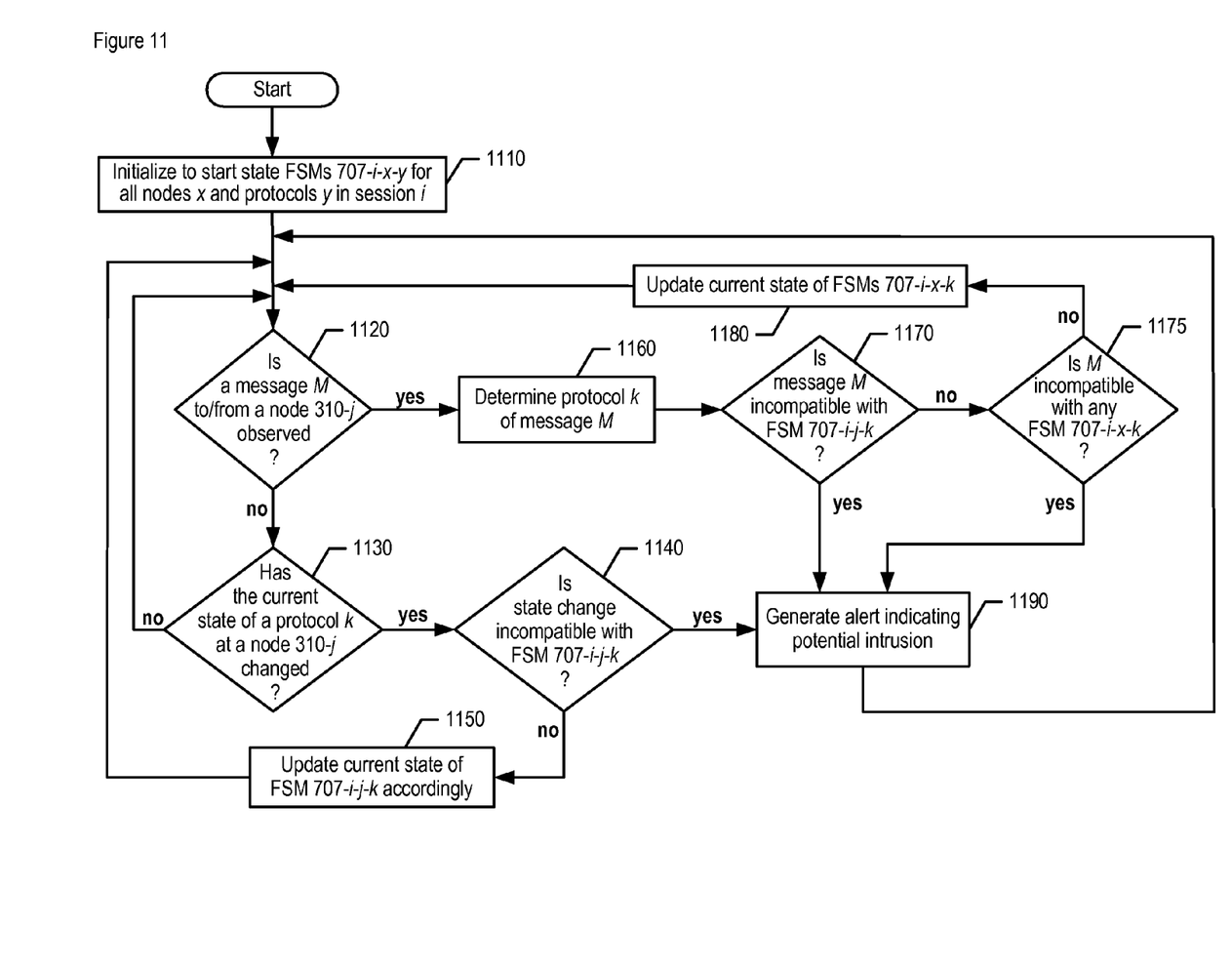
FIG. 11 depicts a flowchart of the salient tasks of the first thread, which is spawned at task 1020 of FIG. 10, in accordance with the illustrative embodiment of the present invention.

FIG. 11 depicts a flowchart of the salient tasks of the first thread spawned at task 1020, in accordance with the illustrative embodiment of the present invention.

At task 1110, the thread initializes FSMs 707-*i*-*x*-*y*, for all nodes x and protocols y in session i, to their start states, in well-known fashion.

At task 1120, the thread checks if a message M sent to or from a node 310-*j* in session i has been observed. If so, then execution branches to task 1160, otherwise execution branches to task 1130.

At task 1130, the thread checks whether the current state of a protocol k at a node 310-*j* in session i has changed. If so, then execution branches to task 1140, otherwise execution branches back to task 1120.

At task 1140, the thread checks whether the state change at node 310-*j* is incompatible with finite-state machine (FSM) 707-*i*-*j*-*k* (e.g., a transition from state 801 of FIG. 8 to state 805 without any intermediate states, etc.). If the state change is incompatible, execution branches to task 1190, otherwise execution branches to task 1150.

At task 1150, the thread updates the current state of finite-state machine (FSM) 707-*i*-*j*-*k* accordingly via token 800. After task 1150, execution continues back at task 1120.

At task 1160, the thread determines the protocol k of message M, in well-known fashion. After task 1160, execution continues at task 1170.

At task 1170, the thread checks whether message M is incompatible with finite-state machine (FSM) 707-*i*-*j*-*k*. If so, execution branches to task 1190, otherwise execution branches to task 1175.

At task 1175, the thread checks whether message M is incompatible with some other finite-state machine (FSM) 707-*i*-*x*-*k* for another node 310-*x* in session i (x≠j). If so, execution branches to task 1190, otherwise execution branches to task 1180.

At task 1180, the thread updates the current states of finite-state machines (FSMs) 707-*i*-*y*-*k* for each node 310-*y* in session i. After task 1180, execution continues back at task 1120.

At task 1190, the thread generates an alert that indicates a potential intrusion. In some embodiments of the present invention the alert might specify a particular node 310 as the likely target (or "victim") of the potential intrusion (e.g., the node associated with the FSM 707 incompatibility, etc.), while in some other embodiments the alert might not specify any particular node. After task 1190, execution continues at task 1120.

Figure 12:
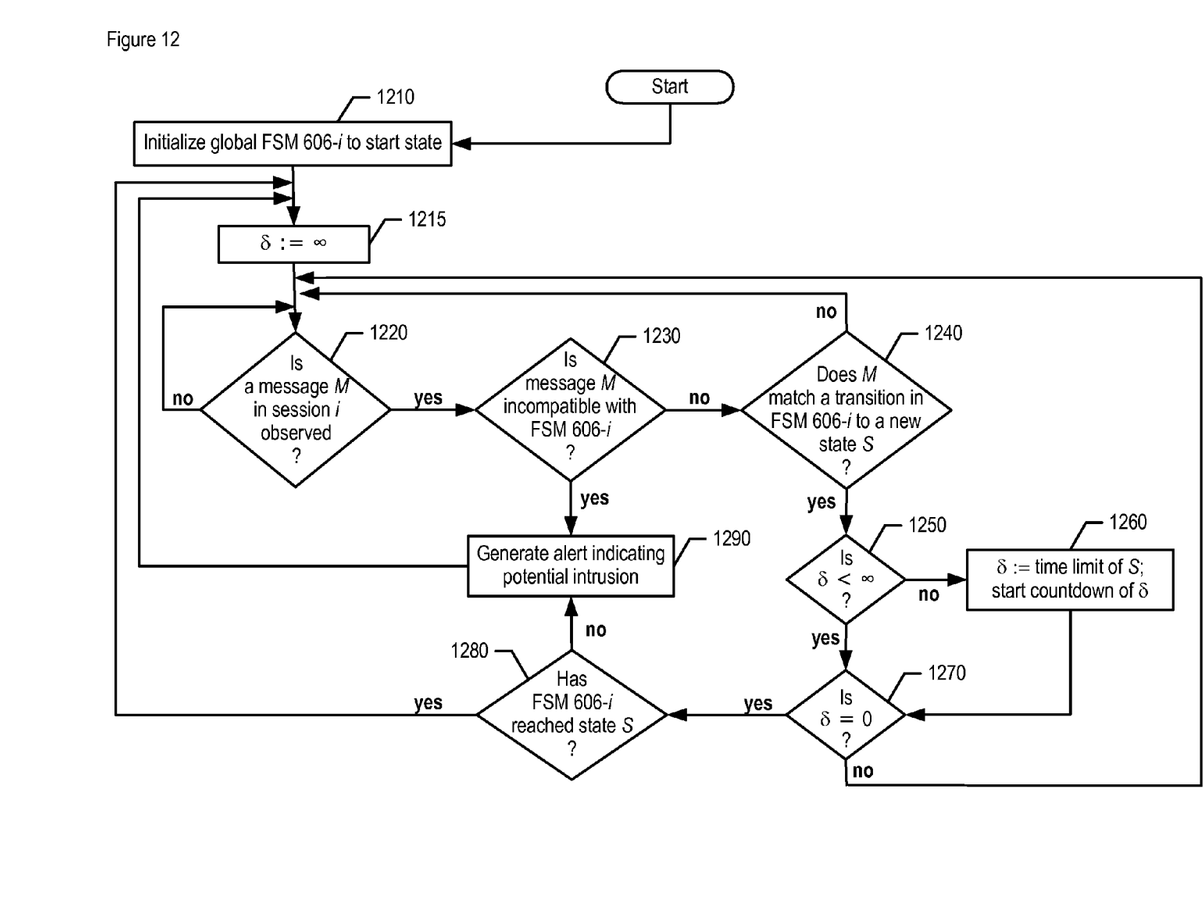
FIG. 12 depicts a flowchart of the salient tasks of the second thread, which is spawned at task 1030 of FIG. 10, in accordance with the illustrative embodiment of the present invention.

FIG. 12 depicts a flowchart of the salient tasks of the second thread spawned at task 1030, in accordance with the illustrative embodiment of the present invention.

At task 1210, the thread initializes global finite-state machine (FSM) 606-*i* to its start state.

At task 1215, the thread sets δ:=∞.

At task 1220, the thread checks whether a message M belonging to session i has been observed. If so, then execution proceeds to task 1230, otherwise execution continues back at task 1220.

At task 1230, the thread checks whether message M is incompatible with global finite-state machine (FSM) 606-*i*. If so, then execution continues at task 1290, otherwise execution proceeds to task 1240.

At task 1240, the thread checks whether message M matches the label of a state transition of global finite-state machine (FSM) 606-*i* from its current state to a new state S. If so, then execution proceeds to task 1250, otherwise execution continues back at task 1220.

At task 1250, the thread branches based on whether δ is finite. If it is, then execution continues at task 1270, otherwise execution proceeds to task 1260.

At task 1260, the thread sets the value of δ to the time limit specified by state S, and starts a real-time countdown of δ to zero.

At task 1270, the thread branches based on whether δ equals zero. If so, then execution proceeds to task 1280, otherwise execution continues back at task 1220.

At task 1280, the thread checks whether global finite-state machine (FSM) 606-*i* has reached state S. If not, then execution proceeds to task 1290, otherwise execution continues back at task 1215.

At task 1290, the thread generates an alert that indicates a potential intrusion, as described above at task 1190. After task 1290, execution continues back at task 1215.

As will be appreciated by those skilled in the art, although the illustrative embodiment has been disclosed in the context of Voice over Internet Protocol (VoIP) systems, it will be clear to those skilled in the art, after reading this disclosure, how to make and use embodiments of the present invention for other types of systems and for other types of protocols having finite-state machine (FSM) representations.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for intrusion detection with distributed stateful intrusion detection, comprising:

receiving a Session Initiation Protocol (SIP) signal as an application-layer protocol signal at a receiver of a Voice Over Internet Protocol (VoIP) intrusion detection systems from a network;

distributing the received application-layer protocol signal to a first finite-state machine and to a second finite-state machine;

detecting, by a data processing system, that the application-layer protocol enters a first application-layer protocol state $S_1$ at a first node at a first time;

determining, by the data processing system, whether the application-layer protocol fails to enter a second application-layer protocol state $S_2$ at a second node within δ seconds of the first time, wherein δ is a positive real number; and generating, by the data-processing system, an alert signal that indicates a potential intrusion in response to the determination, wherein said first application-layer protocol state corresponds a first finite-state machine for said protocol and said first node, and wherein said second application-layer protocol state corresponds to a second finite-state machine for said protocol and said second node, wherein transition to an application-layer protocol state is based upon communication of an application-layer protocol message, and wherein said data-processing system comprises hardware.

2. The method of claim 1 wherein said first finite-state machine represents all allowed application-layer protocol states and application-layer protocol state transitions for said application-layer protocol at said first node, and wherein said second finite state machine represents all allowed states and application-layer protocol state transitions for said application-layer protocol at said second node.

3. The method of claim 1 further comprising blocking by said data processing system a subsequent message from reaching its destination in response to the generation of said alert signal.

4. The method of claim 1 wherein the value of δ is based on at least one of said first application-layer protocol state and said second application-layer protocol state.

5. The method of claim 1 wherein said first node and said second node participate in a session and communicate via said application-layer protocol within said session.

6. The method of claim 5 wherein said signal identifies at least one node that participates in said session.

* * * * *